United States Patent Office 3,180,173
Patented Apr. 27, 1965

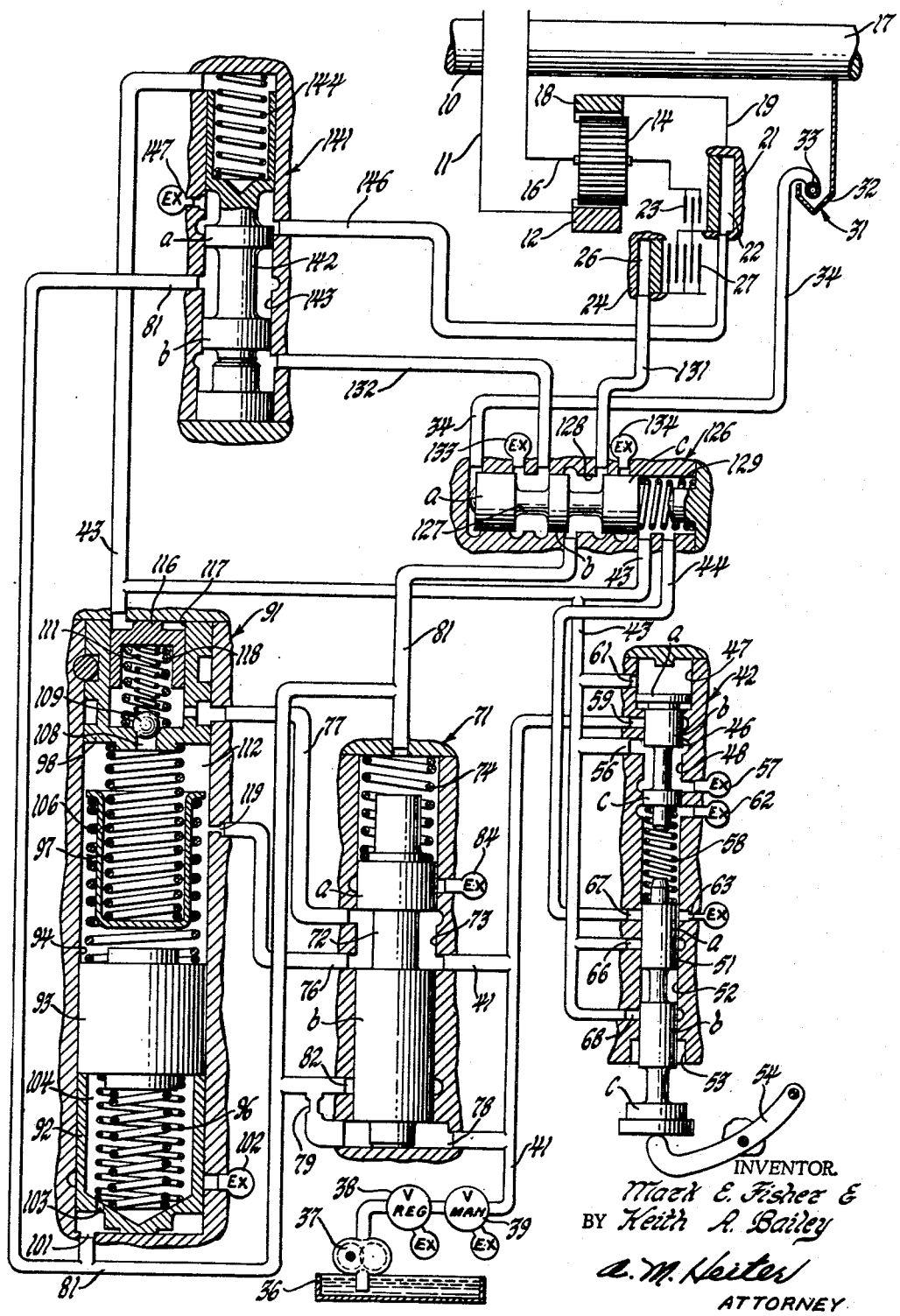

3,180,173
TRANSMISSION
Mark E. Fisher, Carmel, and Keith A. Bailey, Speedway City, Ind., assignors to General Motors Corporation, Detroit, Mich., a corporation of Delaware
Filed Nov. 5, 1962, Ser. No. 235,449
2 Claims. (Cl. 74—472)

This invention relates to transmissions and particularly a control system for automatic transmissions.

In automatic transmissions having a fluid operated ratio change mechanism controlled by a shift valve actuated by governor and torque demand pressures, the high rate of flow of fluid in the shift valve to fill the motor employed to engage the ratio causes a Bernoulli or throttling effect to occur in the shift valve which changes the pressure in the shift valve and the pressure delivered to the motor. In control systems where shift control regulator valves are employed to provide a predetermined cycle of variations during the filling of a motor for engagement of a ratio, the moving of the friction device from a disengaged position to a fully engaged position, it is important that this pressure regulation cycle be effective at the motor. Also, the high rate of flow of fluid through the shift valve due to the Bernoulli effect creates an unbalanced fluid force acting on the shift valve interfering with its normal operation. In order to overcome these problems there is provided in the control system a relay valve actuated by a small volume of fluid from the shift valve. The relay valve thus moves with a very quick action to directly connect the shift cycle regulated fluid pressure directly to the ratio motor.

An object of the invention is to provide in an automatic transmission having a governor and torque demand pressure controlled shift valve and a shift cycle pressure regulated valve, a relay valve controlled by a shift valve to connect the shift cycle regulated pressure directly to the ratio motor.

These and other objects of the invention will be more apparent from the following description and drawings of the preferred embodiment of the invention.

The drawing diagrammatically shows the transmission and control system.

The invention is illustrated in a two-speed component of a transmission having an input shaft 10 connected by an input hub 11 to drive a ring gear 12. The planetary pinions 14 mounted on the carrier 16 connected to drive the output shaft 17 mesh with the ring gear 12 and a controlled sun gear 18. The sun gear 18 is connected by the hub structure 19 to the clutch motor housing 21 containing the motor 22, consisting of a piston and cylinder, which actuates the clutch 23 to on engagement connect the sun gear 18 to the carrier 16 for high speed ratio or direct drive. Located in the stationary housing 24 is a fluid motor 26 consisting of a piston and cylinder arranged to actuate the brake 27 which through the connection provided by the clutch housing 21 and hub 19 holds the sun gear 18 stationary to provide underdrive or low speed ratio. Suitable retraction springs, not shown, return the motors for disengagement when the fluid is exhausted from the motors.

The Pitot tube governor 31, having an annular trough 32 rotatably mounted on the output shaft 17 for rotating a body of fluid in the trough, provides a pressure in the Pitot tube 33 proportional to output speed and supplies this pressure to the governor line 34. Fluid from the exhausts, the lubrication system and leakage collects in the sump 36 located in the bottom of the transmission housing and is supplied by input driven shaft pump 37 to the main line pressure regulator valve 38 which supplies a regulated pressure to the system which may be controlled by a manual control valve 39 for entry to the main line 41 of the control system.

Throttle valve

The main line 41 is connected to the throttle valve 42 to provide throttle pressure proportional to throttle pedal position or torque demand in the throttle pressure line 43 and main line pressure in the downshift line 44. The throttle valve 42 has a regulator valve 46 having a large end land $a$ and smaller land $b$ and $c$ of equal diameter. The land $a$ is located in the large end of bore portion 47 while the lands $b$ and $c$ are located on a smaller bore portion 48. The downshift valve element 51 has lands $a$, $b$ and $c$ with lands $a$ and $b$ operating in a small diameter bore portion 52, and land $c$ operating in the larger bore portion 53. The throttle pedal is connected by a suitable linkage 54 to actuate the valve element 51 and is illustrated in the zero throttle pedal position.

In the position shown at zero throttle, the throttle pressure line 43 is connected via branch 56 to exhaust 57 to provide zero throttle pressure at zero throttle. On advancing the throttle the lever 54 moves the valve element 51 to compress the spring 58 to move the valve element 46 to open the main line port 59 to supply regulated throttle pressure to the throttle line 43. The throttle pressure from line 43 enters at port 61 to bore 47 to act on the land $a$ to oppose the force transmitted by spring 58 to valve element 46 to tend to close the valve to regulate the pressure proportional to throttle pedal position. The exhaust 62 vents the chamber between the regulator valve and the downshift valve. With the downshift valve 51 in the position shown, pressure in downshift line 44 bleeds off through exhaust orifice 63 so no downshift pressure is provided during the normal throttle range. At or just beyond full throttle, the space between lands $a$ and $b$ of valve element 51 connects throttle pressure port 66 to downshift port 67 to supply throttle pressure, which at full throttle is equal to main line pressure to the downshift line 44. At the same time throttle pressure is connected via port 68 and the space between lands $b$ and $c$ to the bore 53 to act on the unbalanced area of land $c$ to provide a hydraulic detent opposing movement of the valve to this position to signal the operator that the valve is in the downshift position.

Flow valve

The flow valve 71 controls a pressure signal in response to flow of fluid to a ratio engaging motor to provide a signal during the period the ratio engaging motor is moving from a disengaged position to an engaged position or during the period of engagement. The flow valve 71 has a valve element 72 having lands $a$ and $b$ of equal diameter located in a bore 73. The spring 74 normally holds a valve in the open position shown connecting the main line 41 to the control line 76 and the disabling line 77. Main line 41 is connected at port 78 to act on the end of the land $b$ and then to flow through the orifice 79 to the ratio supply line 81. The bypass port 82 is provided to connect port 78 to line 81 in bypass relationship to orifice 79 to limit the pressure drop in line 81. Whenever a ratio engaging device is engaged there is flow from main line 41 through the orifice 79 to the ratio line 81 causing a pressure reduction in the ratio line 81 reducing the fluid pressure in the spring chamber end of bore 73 acting on the land $a$ permitting main line pressure acting on the lower end of land $b$ to raise the valve against the spring biasing force and the pressure on land $a$ to block the connection between main line 41 and disabling line 77 and to connect disabling line 77 to exhaust 84. The main line is always connected to control line 76 around the land $b$ and thus when the pressure at both ends of the valve is equal and the spring moves the valve to the non-flow position shown, main line 41 is connected to control line 76 and disabling line 77.

Shift cycle regulator valve

The shift cycle regulator valve 91, on the initiation of each shift cycle provides an initial low pressure which is varied in accordance with throttle pressure and thereafter a gradually increased pressure until the main line pressure value is reached. Valve 91 has a regulator valve element 92 and a valve plug 93 located in a valve bore 94. A dual control spring 96 is located between the valve plug 93 and regulating valve element 92. A biasing spring assembly 97 is located between the plug 93 and a fixed abutment structure 98. The ratio line 81 is connected at port 101 to the end of the bore 94 to act on the end of regulator valve element 92 to move this valve element and plug 93 against the biasing force of spring assembly 97 to open exhaust 102 to vent ratio line 81 to regulate the pressure at an initial low value. At the same time fluid from ratio line 81 flows through orifice 103 to fill the chamber 104 between the valve element 92 and plug 93 to balance the pressure permitting the spring 96 to separate the valve element and valve plug to increase the biasing force provided by spring assembly 97 to provide a gradually increased pressure which increases to main line pressure when the plug 93 bottoms on the strut 106 incorporated in the spring assembly 97.

The control regulator valve, consisting of the port 108 controlled by the ball valve element 109 biased to the closed position by spring 111, controls the pressure in the spring chamber 112 to modify the regulating effect of the spring assembly 97. The biasing force of spring 111 on valve element 109 is varied by throttle pressure supplied via line 43. Throttle pressure acts on the movable abutment 116, movably mounted in the bore 117 and biased to the position shown by the spring 118 to vary the force provided by spring 111. With the shift cycle regulator valve 91 and the flow valve 71 in the position shown, fluid is supplied to the control line 76 and through the orifice 119 to fill the chamber 112 and main line fluid is supplied by disabling line 77 to close valve 109 to prevent exhaust of fluid from chamber 112 to lock valve 91 in the non-regulatory position shown. When there is flow to engage a ratio motor, the disabling line 77 is connected to exhaust 84 to permit free operation of the ball valve element 109. Thus the fluid supplied via control line 76 to chamber 112 is regulated at a pressure variable in accordance with torque demand or throttle pressure supplied via line 43 to bore 117 to move the abutment 116 in accordance with throttle pressure to control the pressure in chamber 112 to vary the initially regulated low pressure value.

Shift valve

The shift valve 126 has a valve element 127 having lands a, b and c located in a bore 128, closed at both ends. Line 34 supplies governor pressure at one end to act on land a and a biasing spring 129 is located at the other end to, with either throttle pressure supplied by line 43 or downshift pressure supplied by line 44, bias the valve in the opposite direction. The valve is shown in low speed position with the ratio supply line 81 connected between the ports b and c to the low ratio line 131 while the shift control line 132 is connected to exhaust 133. When governor pressure overcomes the opposing forces, the valve moves to the right connecting ratio line 81 to shift control line 132 and connecting low ratio line 131 to exhaust 134.

Relay valve

The relay valve operates in response to the shift valve to connect the shift cycle regulator pressure to the ratio motor. The shift valve 141 has a valve element 142 having lands a and b of equal diameter located in a bore 143. The spring 144 biases the valve element 142 to the exhaust position connecting the high clutch line 146 to the orifice exhaust 147. When the shift valve 126 supplies fluid under pressure via control line 132 to the lower closed end of bore 143 to act on land b to move valve 142 against the spring 144 to the open position, the ratio supply line 81 is connected between the lands a and b to the high clutch line 146 directly to engage the high clutch. Since very little flow is required to move the valve since the line 132 and valve chamber are very small and are generally filled with fluid, the Bernoulli effect on the shift valve is eliminated.

Operation

In the normal low speed ration shown the shift valve 126 connects the ratio supply line 81 to the low ratio line 131 to supply a pressure during engagement of low ratio regulated in accordance with the regulation cycle of the regulator valve 91. On a shift to high ratio where the shift valve 126 will move in response to the control forces provided by the governor line 34 and the throttle line 43, the shift valve 126 connects the ratio supply line 81 to the control line 132 which actuates the relay valve 141 to connect the ratio supply line 81 to the high ratio line 146 to provide fluid initially regulated in accordance with the regulation cycle of the shift regulator valve 91. Thus the normal high flow through the shift valve which interferes with the control operation of the shift valve is avoided. Also, the change in pressure due to the throttling effect of the shift valve on the shift cycle regulated pressure is also avoided.

The above described preferred embodiment is illustrative of the invention which may be modified within the scope of the appended claims.

We claim:

1. In a transmission; a multiratio drive unit providing a low and a higher drive ratio and having low fluid operated means and high fluid operated means for engaging said low and higher drive ratios; a source of fluid under a regulated pressure; governor means connected to said drive unit providing a governor pressure proportional to the speed of said drive unit; torque demand means providing a torque pressure proportional to the torque demand; a shift valve controlled by said governor pressure and throttle pressure having an inlet; a low speed outlet connected to said low fluid operated means and a high speed outlet; a flow valve means having a ratio supply line connecting said source to said shift valve inlet operative in response to flow in said ratio supply line in a non-flow position to provide a control pressure and a disabling pressure and operative in a flow position to provide a control pressure; a shift cycle regulator valve means connected to said ratio supply line, flow valve means, and torque demand means and operative in response to said disabling pressure to maintain the pressure in a ratio supply line at main line pressure and operative in response to said control pressure and the discontinuance of said disabling pressure to initially regulate the pressure in said ratio supply line at a low initial value proportional to torque demand and to gradually increase the pressure to main line pressure; a relay valve connected to said high speed outlet, said ratio supply line and said high fluid operated means operative in response to operation of said shift valve to supply pressure to said high speed outlet to directly connect said ratio supply line to said high fluid operated means.

2. In a transmission; a multiratio drive unit providing a low and a higher drive ratio and having low fluid operated means and high fluid operated means for engaging said low and higher drive ratios; a source of fluid under a regulated pressure; governor means connected to said drive unit providing a governor pressure proportional to the speed of said drive unit; torque demand means providing a torque pressure proportional to the torque demand; a shift valve controlled by said governor pressure and throttle pressure having an inlet, a low speed outlet connected to said low fluid operated means and a high speed outlet; a flow valve means having a ratio supply line connecting said source to said shift valve inlet operative in response to flow in said ratio supply line in a non-flow position to provide a control pressure and a disabling pressure and operative in a flow position to provide a control pressure; a shift cycle regulator valve means connected to said ratio supply line, flow valve means, and torque demand means and operative in response to said disabling pressure to maintain the pressure in a ratio supply line at main line pressure and operative in response to said control pressure and the discontinuance of said disabling pressure to initially regulate the pressure in said ratio supply line at a low initial value proportional to torque demand and to gradually increase the pressure to main line pressure; a relay valve connected to said high speed outlet, said ratio supply line and said high fluid operated means operative in response to the supply of a very small volume of fluid from said shift valve supply pressure to said high speed outlet to directly connect said ratio supply line to said high fluid operated means.

References Cited by the Examiner
UNITED STATES PATENTS 2,713,800   7/55   Forster.
3,053,116   9/62   Christenson et al.
3,078,736   2/63   Meads et al.

DON A. WAITE, *Primary Examiner.*

UNITED STATES PATENT OFFICE
CERTIFICATE OF CORRECTION

Patent No. 3,180,173                                   April 27, 1965

Mark E. Fisher et al.

It is hereby certified that error appears in the above numbered patent requiring correction and that the said Letters Patent should read as corrected below.

Column 3, line 9, for "Value" read -- Valve --; column 4, line 11, for "ration" read -- ratio --; column 6, line 3, after "valve" insert -- to --.

Signed and sealed this 15th day of March 1966.

(SEAL)
Attest:

ERNEST W. SWIDER                              EDWARD J. BRENNER
Attesting Officer                                   Commissioner of Patents